United States Patent
Weng et al.

(10) Patent No.: US 7,374,330 B2
(45) Date of Patent: May 20, 2008

(54) BACKLIGHT MODULE HOUSING AND LIQUID CRYSTAL DISPLAY DEVICE

(75) Inventors: Lin-Chu Weng, Hsinchu (TW); Ping-Feng Hwang, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 11/682,270

(22) Filed: Mar. 5, 2007

(65) Prior Publication Data
US 2007/0268723 A1    Nov. 22, 2007

(30) Foreign Application Priority Data
May 16, 2006   (TW) .............................. 95117288 A (51) Int. Cl.
*F21V 8/00* (2006.01)

(52) U.S. Cl. ................. 362/633; 362/632; 362/614

(58) Field of Classification Search ................ 362/632, 362/633, 634, 614
See application file for complete search history.

(56) References Cited

U.S. PATENT DOCUMENTS

| 7,083,318 | B2 * | 8/2006 | Ha et al. ..................... 362/633 |
| 7,086,773 | B2 * | 8/2006 | Kim et al. .................. 362/621 |
| 2003/0048629 | A1 * | 3/2003 | Kim et al. .................... 362/27 |
| 2007/0147090 | A1 * | 6/2007 | Hung ......................... 362/632 |

FOREIGN PATENT DOCUMENTS

CN           09520094180       *   2/2006

* cited by examiner

*Primary Examiner*—Laura Tso
(74) *Attorney, Agent, or Firm*—Winston Hsu (57) ABSTRACT

A backlight module housing includes a frame forming a holding space, a light source being accommodated on a side of the holding space, and at least one lateral alignment structure connected to the side of the frame accommodating the light source and protruding to the holding space for laterally immobilizing a display panel when the display panel is accommodated inside the holding space of the frame.

15 Claims, 10 Drawing Sheets

BACKLIGHT MODULE HOUSING AND LIQUID CRYSTAL DISPLAY DEVICE

BACKGROUND OF THE INVENTION

1. Field of the Invention

The present invention relates to a backlight module housing, and more particularly, to a backlight module housing for immobilizing a display panel.

2. Description of the Prior Art

Figure 1:
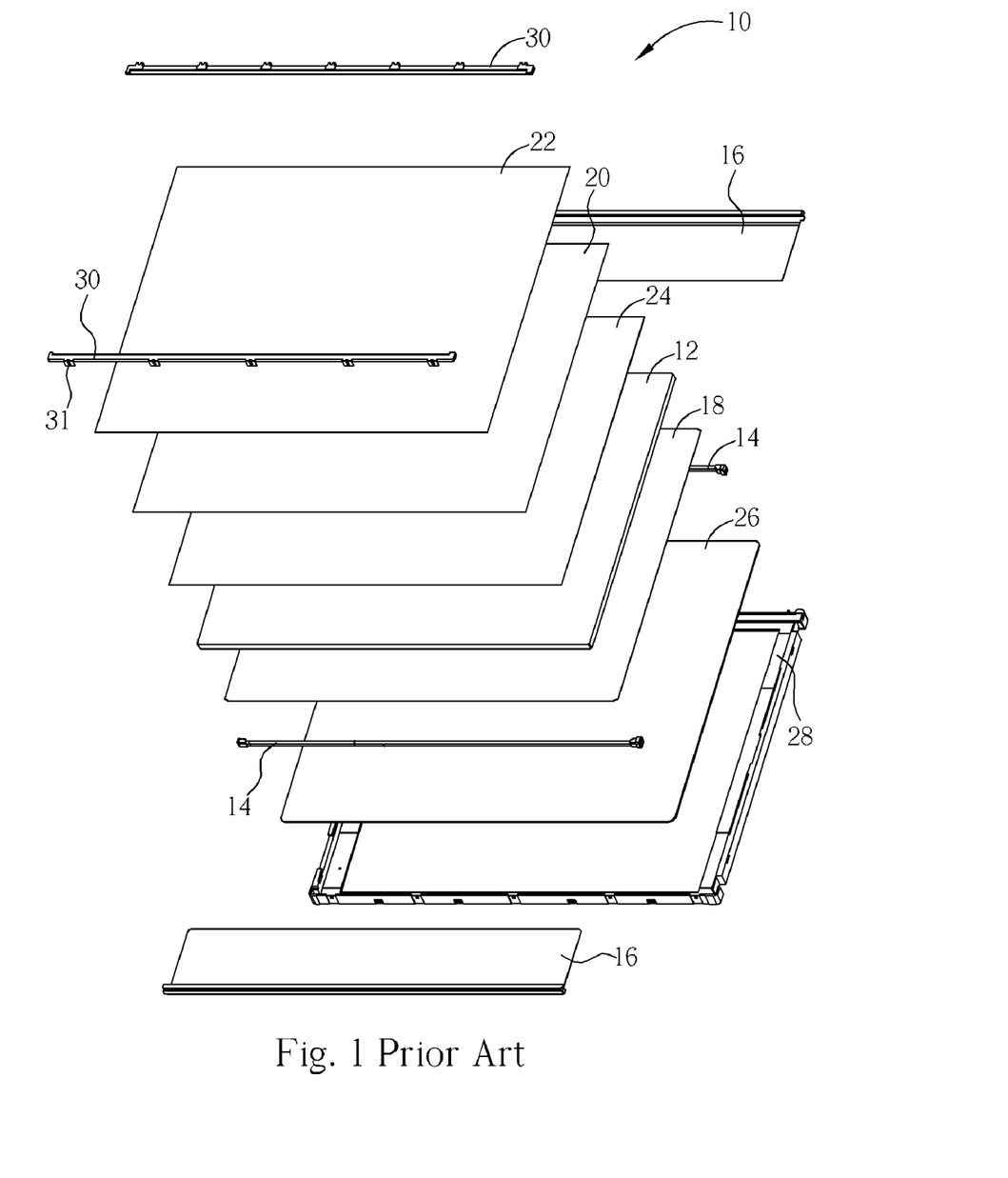
FIG. 1 is an exploded diagram of an edge-type backlight module in the prior art.

Please refer to FIG. 1. FIG. 1 is an exploded diagram of an edge-type backlight module 10 in the prior art. The edge-type backlight module 10 includes a light guide plate 12, and two light sources 14 installed on a top side and a bottom side of the light guide plate 12 respectively. The light sources can be cold cathode fluorescent lamps. The edge-type backlight module 10 further includes two lampshades 16 installed outside the two light source 14 respectively for reflecting light emitted from the two light sources 14 to the light guide plate 12 so as to increase a light utility rate, a reflecting sheet 18 installed below the light guide plate 12 for reflecting light emitted through the light guide plate 12 downward back to the light guide plate 12 so as to increase a light utility rate, a brightness enhancement film 20 for enhancing brightness of light, an upper diffuse plate 22 installed above the brightness enhancement film 20 for diffusing light and protecting the brightness enhancement film 20 from scraping, a lower diffuse plate 24 installed between the brightness enhancement film 20 and the light guide plate 12 for diffusing light, and a metal plate 26 for supporting above-mentioned components.

Figure 2:
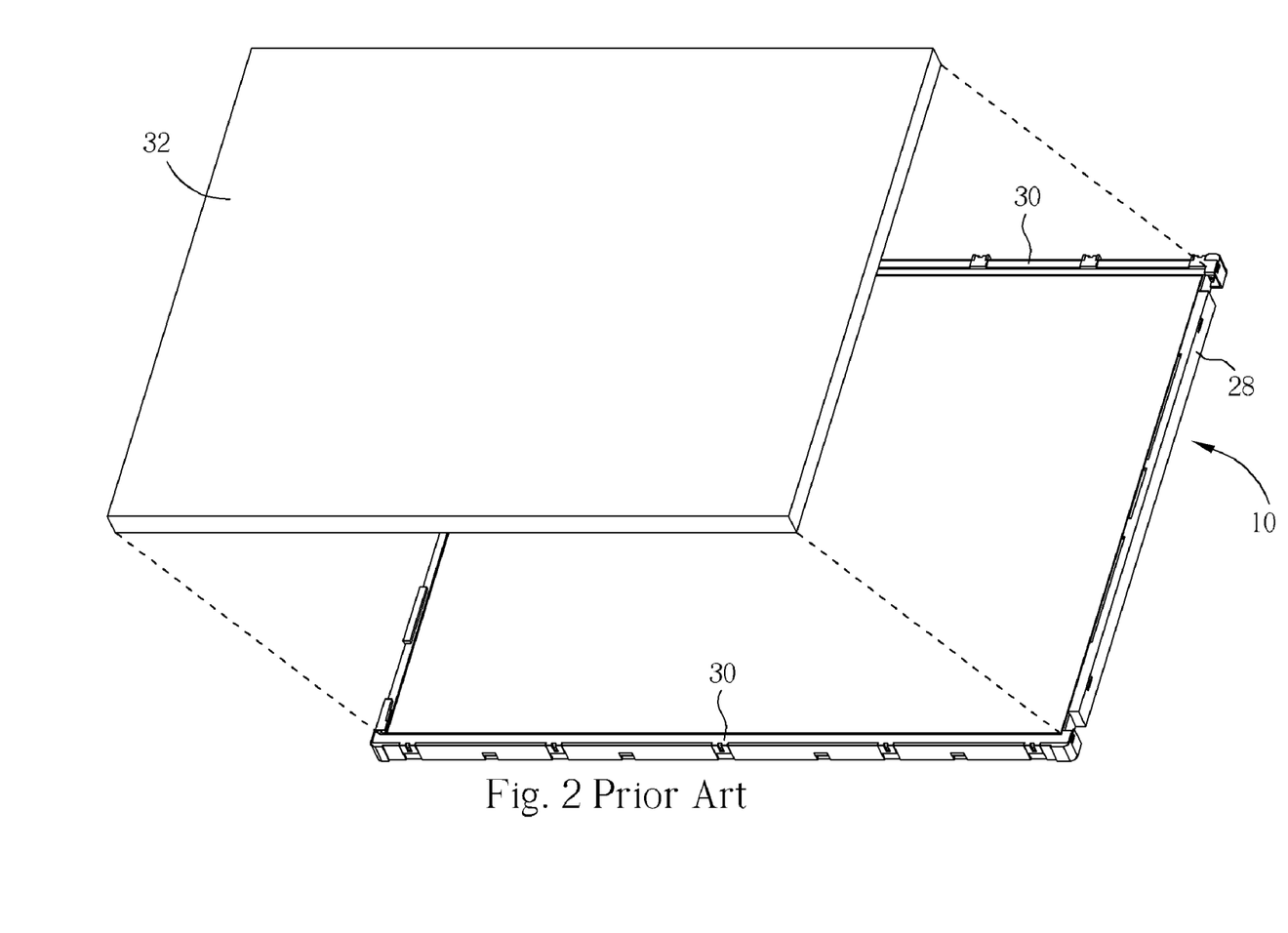
FIG. 2 is a perspective drawing of the edge-type backlight module in FIG. 1 and a display panel in the prior art.

The edge-type backlight module 10 further includes a backlight module housing 28 for accommodating the light guide plate 12, the two light sources 14, the two lampshade 16, the reflecting sheet 18, the brightness enhancement film 20, the upper diffuse plate 22, the lower diffuse plate 24, the metal plate 26, and two rubber bars 30 installed above the two lampshades 16 and connected with two top edges of the backlight module housing 28 respectively for fixing the two lampshades 16. Please refer to FIG. 2. FIG. 2 is a perspective drawing of the edge-type backlight module 10 and a display panel 32 in the prior art. The display panel 32 is disposed on above the edge-type backlight module 10. The two rubber bars 30 of the edge-type backlight module 10 immobilize a top side and a bottom side of the display panel 32, and a left wall and a right wall of the backlight module housing 28 immobilize a left side and a right side of the display panel 32 so as to immobilize the display panel 32 on four sides. However it increases manufacture and mold cost of the edge-type backlight module 10 that the two rubber bars 30 are utilized for immobilizing the top side and the bottom side of the display panel 32. Hooks 31 of the rubber bars 30 hook the backlight module housing 28 so as to combine the rubber bars 30 with the backlight module housing 28. It is easy to break the hooks 31 of the rubber bars 30 when assembling the rubber bars 30 on the backlight module housing 28.

SUMMARY OF THE INVENTION

It is therefore a primary objective of the claimed invention to provide a backlight module housing for immobilizing a display panel for solving the above-mentioned problem.

According to the claimed invention, a backlight module housing includes a frame including a right wall, a left wall, a top wall, and a bottom wall wherein the right wall, the left wall, the top wall, and the bottom wall form a holding space, a light source being accommodated on a side of the holding space and disposed close to the top wall or the bottom wall, a support part being protruding to the holding space from bottoms of the right wall, the left wall, the top wall, and the bottom wall horizontally for supporting the light source, and an opening being defined by the support part so that the frame is an elastic structure, and at least one lateral alignment structure connected to the side of the frame accommodating the light source and protruding to the holding space for laterally immobilizing a display panel when the display panel is accommodated inside the holding space of the frame.

According to the claimed invention, a display device includes a display panel, and an edge-type backlight module installed below the display panel. The edge-type backlight module includes a light guide plate, a lampshade installed on a lateral side of the light guide plate, a light source installed inside the lampshade for emitting light to the lateral side of the light guide plate, and a backlight module housing. The backlight module housing includes a frame forming a holding space for accommodating the light guide plate, the lampshade, the light source, and the display panel, the frame including a right wall, a left wall, a top wall, and a bottom wall wherein the right wall, the left wall, the top wall, and the bottom wall form the holding space, the lampshade being disposed close to the top wall or the bottom wall, and a support part being protruding to the holding space from bottoms of the right wall, the left wall, the top wall, and the bottom wall horizontally for supporting the lampshade and the light guide plate and for defining an opening so that the frame is an elastic structure, and at least one lateral alignment structure connected to a side of the frame accommodating the lampshade and protruding to the holding space for laterally immobilizing the display panel.

Other objectives, features and advantages of the present invention will be further understood from the further technology features disclosed by the present invention wherein there are shown and described preferred embodiments of this invention, simply by way of illustration of modes best suited to carry out the invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 3:
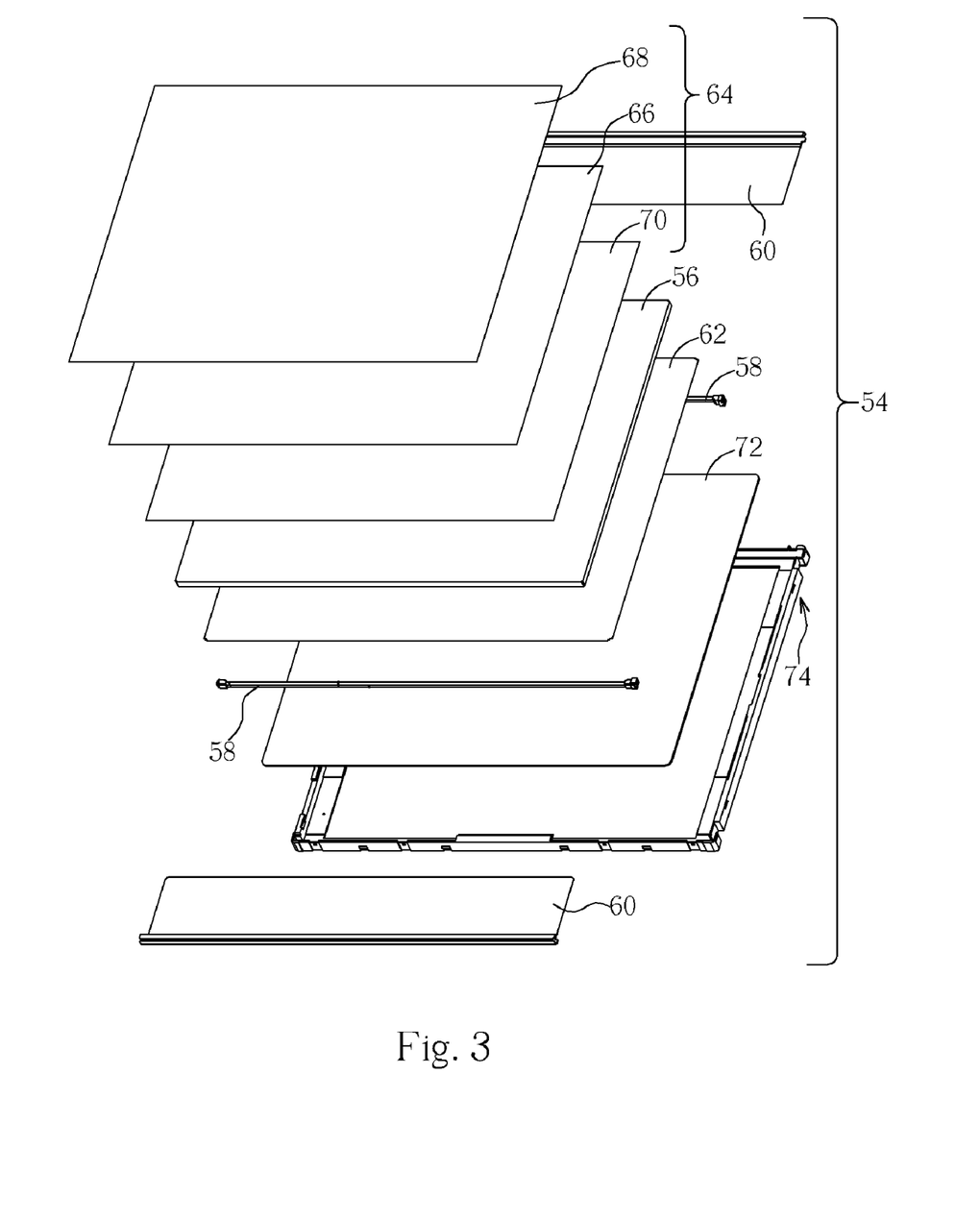
FIG. 3 is an exploded diagram of an edge-type backlight module of the present invention.
Figure 4:
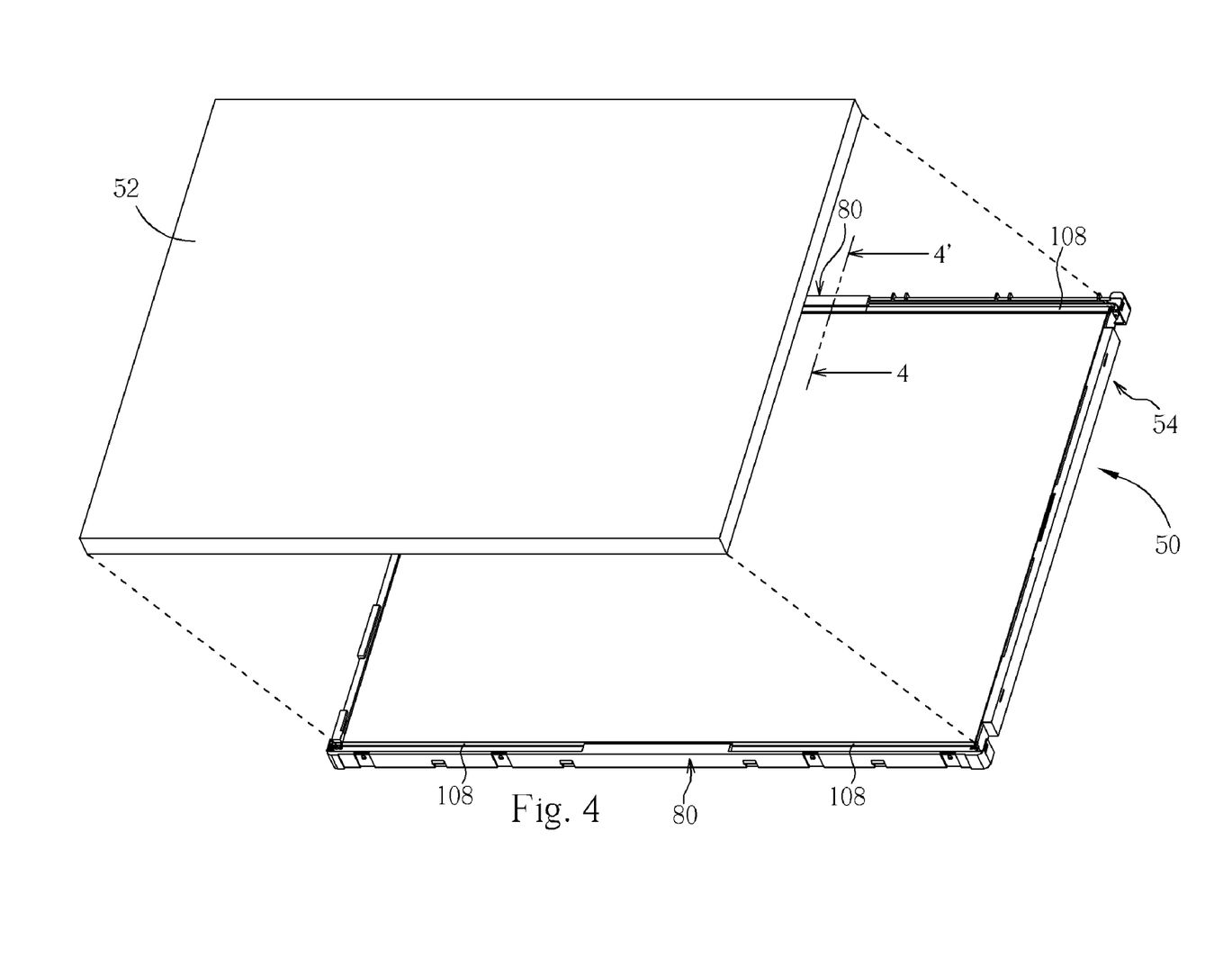
FIG. 4 is a perspective drawing of a display device of the present invention.

Please refer to FIG. 3 and FIG. 4. FIG. 3 is an exploded diagram of an edge-type backlight module 54 of the present invention. FIG. 4 is a perspective drawing of a display device 50 of the present invention. The display device 50 includes a display panel 52, and the edge-type backlight module 54 installed below the display panel 52. The edge-type backlight module 50 includes a light guide plate 56, two light sources 58, two lampshades 60, a reflecting sheet 62, and an optical material layer 64. The two lampshades 60 are installed on a top side and a bottom side of the light guide plate 56 respectively. The two light sources 58 are installed inside the two lampshades 60 and can be cold cathode fluorescent lamps. The two lampshades 60 reflect light emitted from the two light sources 58 to the light guide plate 56 so as to increase a light utility rate. The reflecting sheet 62 is installed below the light guide plate 56 for reflecting light emitted through the light guide plate 56 downward back to the light guide plate 56 so as to increase a light utility rate. The optical material layer 64 is installed between the light guide plate 56 and the display panel 52 for misting and focusing the light refracted from the light guide plate 56 so as to provide uniform and bright light to the display panel 52. The optical material layer 64 includes a brightness enhancement film 66 for enhancing brightness of light, an upper diffuse plate 68 installed above the brightness enhancement film 66 for diffusing light and protecting the brightness enhancement film 66 from scraping, and a lower diffuse plate 70 installed between the brightness enhancement film 66 and the light guide plate 56 for diffusing light. The edge-type backlight module 54 further includes a metal plate 72 for supporting above-mentioned components.

Figure 5:
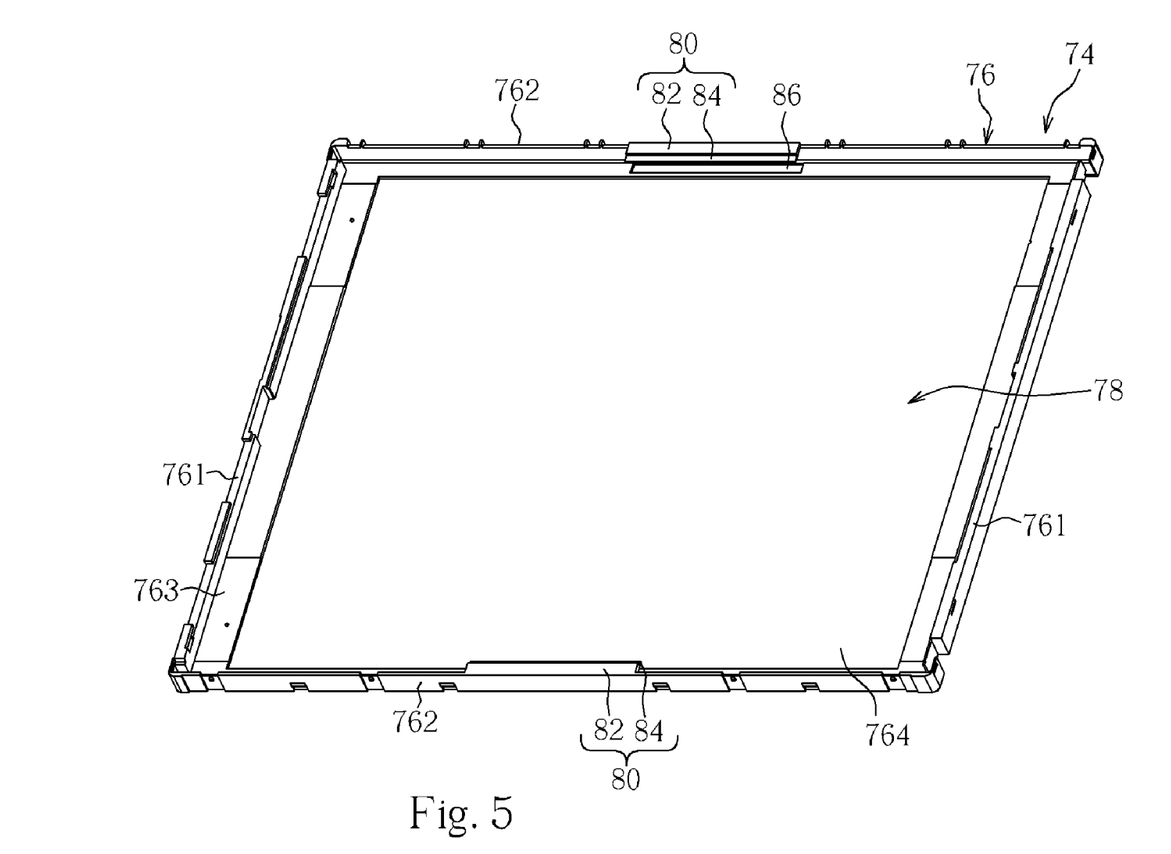
FIG. 5 is a perspective drawing of a backlight module housing of the present invention.

In addition, the edge-type backlight module 54 further includes a backlight module housing 74. Please refer to FIG. 5. FIG. 5 is a perspective drawing of the backlight module housing 74 of the present invention. The backlight module housing 74 includes a frame 76 forming a holding space 78 for accommodating the light guide plate 56, the two light sources 58, the two lampshades 60, the reflecting sheet 62, the optical material layer 64, the metal plate 72, and the display panel 52. The frame 76 of the backlight module housing 74 includes a right wall 761 and a left wall 761, and a top wall 762 and a bottom wall 762. A support part 763 protrudes to the holding space 78 from bottoms of the right and left walls 761 and the top and bottom walls 762 horizontally, and an opening 764 is defined by the support part 763. The support part 763 supports components accommodated inside the holding space 78. The tops of the right and left walls 761 immobilize a left side and a right side of the display panel 52. Furthermore, the backlight module housing 74 further includes two lateral alignment structures 80 connected to the top and bottom walls 762 of the frame 76 and protruding to the holding space 78. The lateral alignment structures 80 and the frame 76 can be connected and formed integrally. Each lateral alignment structure 80 includes an immobilization part 82 and a support part 84. The immobilization part 82 is connected to the top and bottom walls 762 and protruding to the holding space 78. The support part 84 is connected to a side facing the holding space 78 of the immobilization part 82. The joint of the immobilization part 82 and the support part 84 forms a ladder so that the immobilization part 82 can immobilize the display panel 52 laterally when the support part 84 supports the display panel 52. An aperture 86 is formed on the support part 763 of the frame 76 of the backlight module housing 74 and disposed below the lateral alignment structure 80 so that the backlight module housing 74 can be stripped out of a mold of injection molding. A length of each lateral alignment structure 80 is less than a length of the lampshade 60 so as to reduce cost of the lateral alignment structure 80. A cushion 108 is disposed between an edge not contacting with the support part 84 of the display panel 52 and the lampshades. The cushion 108 can be made of silica gel material for providing functions of absorbing the shock, insulation, and isolating heat of the lampshades 60.

Figure 6:
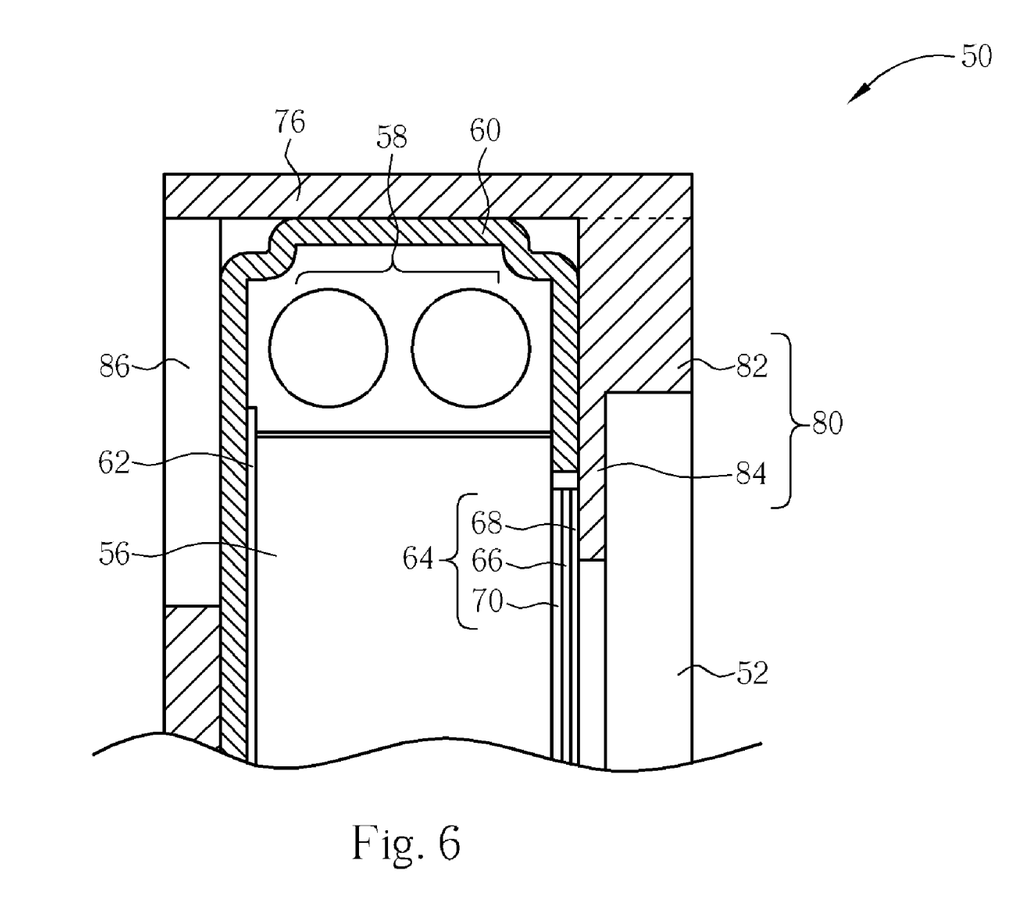
FIG. 6 is a cross-sectional view of the display device along the line 4-4' in FIG. 4 of the present invention.

Please refer to FIG. 6. FIG. 6 is a cross-sectional view of the display device 50 along the line 4-4' in FIG. 4 of the present invention. The lateral alignment structures 80 block the lampshades assembling inside the holding space 78 of the frame 76 vertically. The top and bottom walls 762 of the frame 76 can be pulled in a direction reverse to the holding space 78 so as to deform the frame 76 with elasticity. The lateral alignment structures 80 protruding to the holding space 78 can be removed outside the holding space 78 so that the lampshades 60 can be assembled inside the holding space 78 of the frame 76 vertically, and then a pulling force applied to the frame 76 can be released. The display panel 52 can be disposed on the support part 84 of the lateral alignment structure 80, and the immobilization part 82 can immobilize the display panel 52 laterally. When the display panel 52 is disposed above the edge-type backlight module 54, the immobilization parts 82 of the lateral alignment structures 80 can immobilize a top side and a bottom side of the display panel 52 laterally and the right and left walls 761 of the frame 76 can immobilize a left side and a right side of the display panel 52 so as to immobilize the display panel 52 on four sides.

Figure 7:
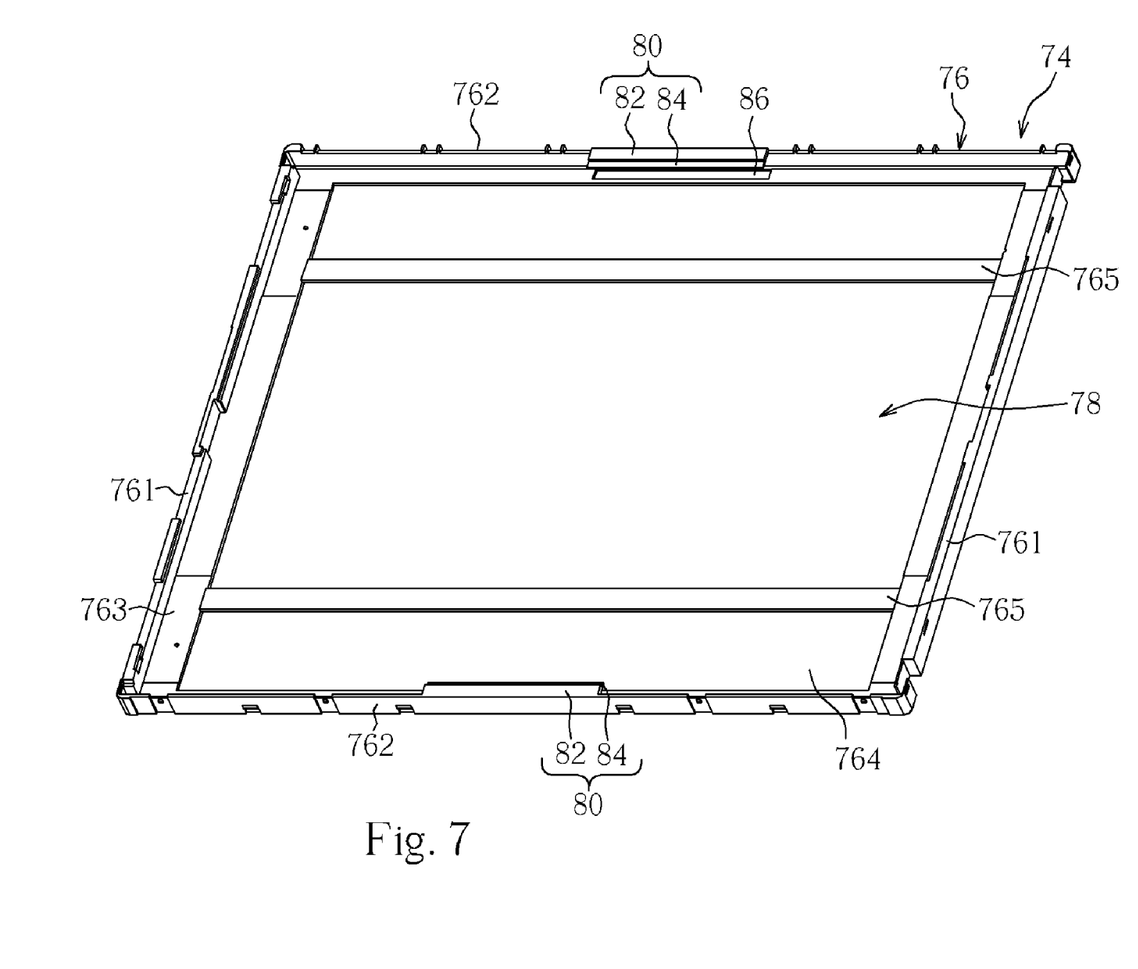
FIG. 7 is a perspective drawing of the backlight module housing according to another embodiment of the present invention.

Please refer to FIG. 7. FIG. 7 is a perspective drawing of the backlight module housing 74 according to another embodiment of the present invention. At least one rib 765 parallel to the top and bottom walls 762 is disposed on the opening 764 of the frame 76 so as to increase structural strength of the frame 76 and an area for supporting components. Because the ribs 765 are parallel to the top and bottom walls 762 of the frame 76, the ribs 765 not only can not interfere elastic deformation of the top and bottom walls 762 of the frame 76 but also increase structural strength of the frame 76.

Figure 8:
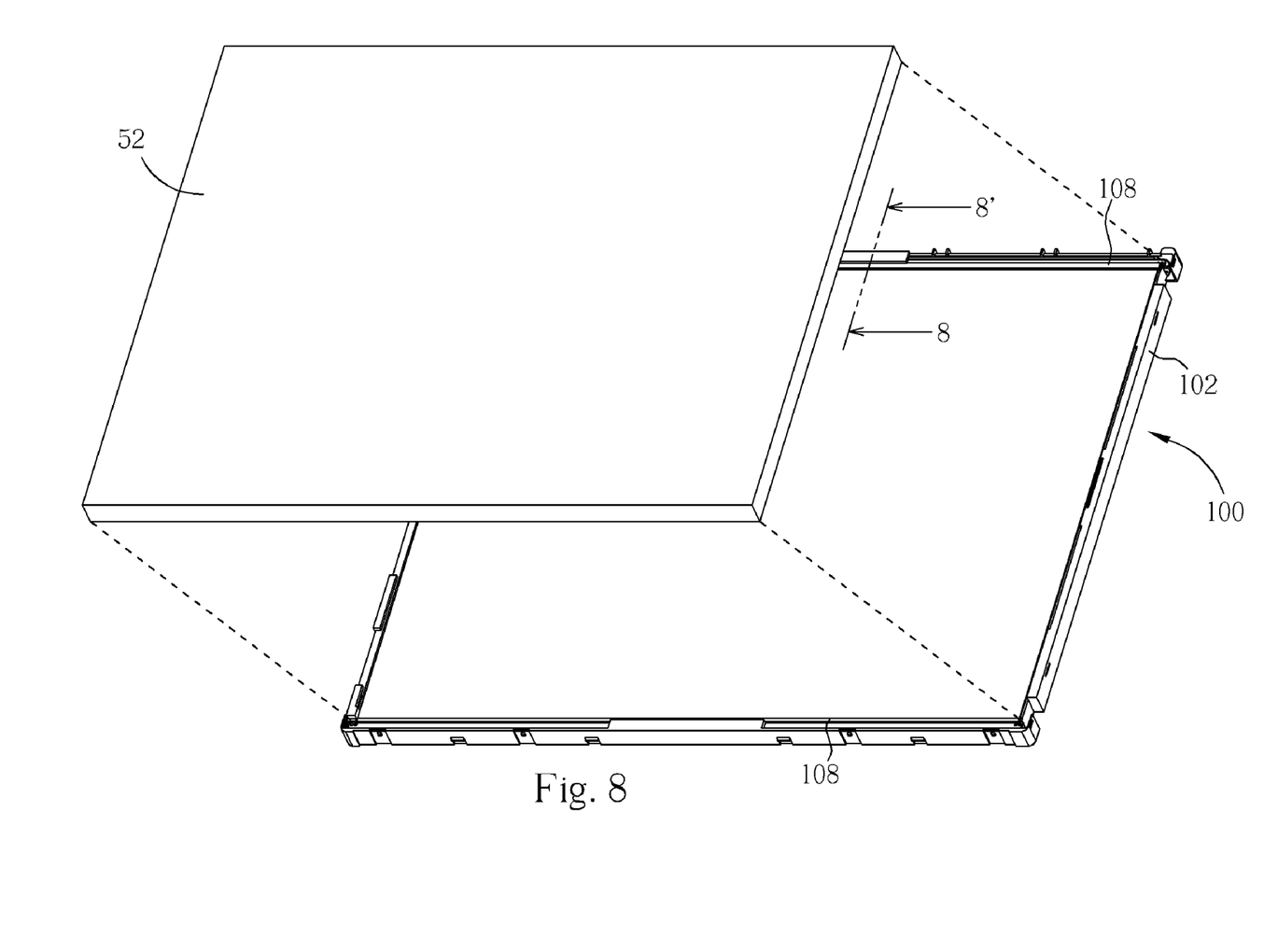
FIG. 8 is a perspective drawing of a display device according to another embodiment of the present invention.
Figure 9:
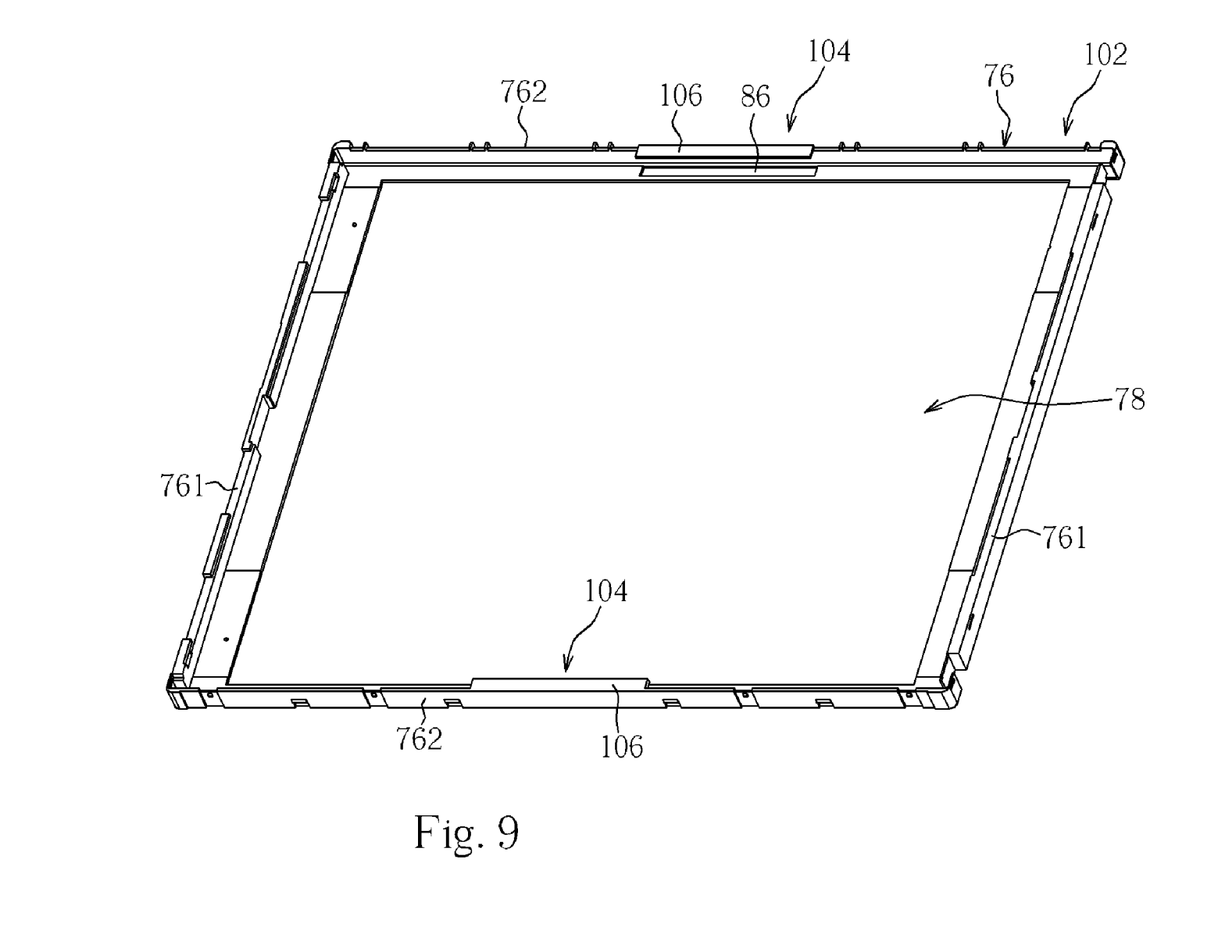
FIG. 9 is a perspective drawing of a backlight module housing of the display device in FIG. 8 of the present invention.
Figure 10:
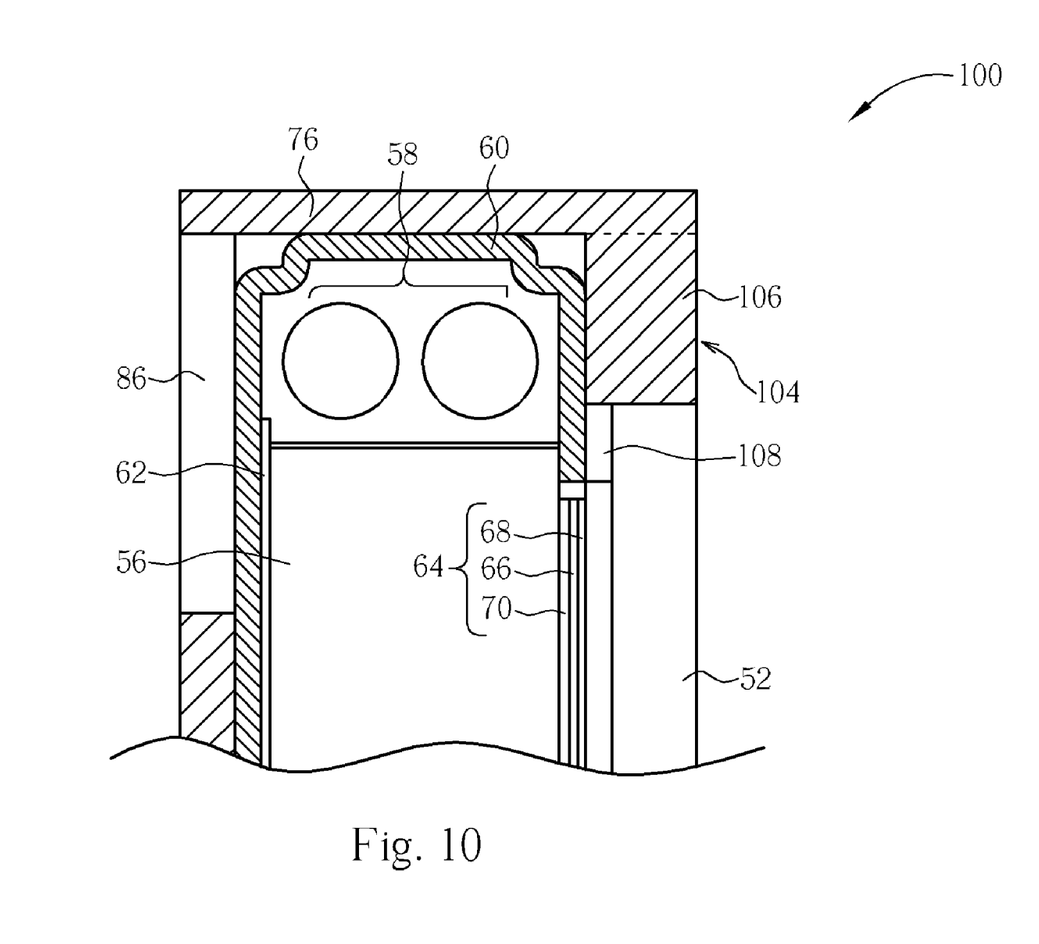
FIG. 10 is a cross-sectional view of the display device along the line 8-8' in FIG. 8 of the present invention.

Please refer to FIG. 8, FIG. 9, and FIG. 10. FIG. 8 is a perspective drawing of a display device 100 according to another embodiment of the present invention. FIG. 9 is a perspective drawing of a backlight module housing 102 of the display device 100 of the present invention. FIG. 10 is a cross-sectional view of the display device 100 along the line 7-7' in FIG. 7 of the present invention. Each lateral alignment structures 104 only includes an immobilization part 106 connected to the top and bottom walls 762 of the frame 76 and protruding to the holding space 78 for immobilize the display panel 52 laterally. The display device 100 includes the cushion 108 for supporting the display panel 52. The cushion 108 is disposed above the lampshade 60 and on a side facing the holding space 78 of the immobilization part 106. The cushion 108 can be made of silica gel material and be a strip extending along a longitudinal direction of the lampshade 60. When the display panel 52 is disposed above the cushion 108, the cushion 108 can provide functions of absorbing the shock, insulation, and isolating heat of the lampshades 60. Similarly, the immobilization part 106 of the lateral alignment structures 104 can immobilize the display panel 52 laterally. That is, the immobilization parts 106 of the lateral alignment structures 104 can immobilize a top side and a bottom side of the display panel 52 laterally and the right and left walls 761 of the frame 76 of the backlight module housing 102 can immobilize a left side and a right side of the display panel 52 so as to immobilize the display panel 52 on four sides.

In contrast to the conventional backlight module housing, the backlight module housing of the present invention utilizes the lateral alignment structure for immobilizing the display panel laterally. There is no need to utilize combination of rubber bars and the backlight module housing for immobilizing the display panel on four sides. The present invention can reduce manufacture cost of the edge-type backlight module and increase a yield factor and fabrication convenience of the edge-type backlight module.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module housing comprising:
   a frame comprising a right wall, a left wall, a top wall, and a bottom wall wherein the right wall, the left wall, the top wall, and the bottom wall form a holding space, a light source being accommodated on a side of the holding space and disposed close to the top wall or the bottom wall, a support part being protruding to the holding space from bottoms of the right wall, the left wall, the top wall, and the bottom wall horizontally for supporting the light source, and an opening being defined by the support part so that the frame is an elastic structure; and
   at least one lateral alignment structure connected to the side of the frame accommodating the light source and protruding to the holding space for laterally immobilizing a display panel when the display panel is accommodated inside the holding space of the frame.

2. The backlight module housing of claim 1 wherein an aperture is formed on the frame and disposed below the lateral alignment structure.

3. The backlight module housing of claim 1 wherein the lateral alignment structure comprises:
   an immobilization part connected to a lateral wall on the side of the frame accommodating the light source and protruding to the holding space for laterally immobilizing the display panel; and
   a support part connected to the immobilization part for supporting the display panel.

4. The backlight module housing of claim 1 wherein the lateral alignment structure and the frame are connected and formed integrally.

5. The backlight module housing of claim 1 wherein at least one rib parallel to the top wall and the bottom wall is disposed on the opening of the frame.

6. The backlight module housing of claim 1 wherein the light source comprises a lampshade and a length of the lateral alignment structure is less than a length of the lampshade.

7. The backlight module housing of claim 6 wherein a cushion is disposed between an edge of the display panel and the lampshade.

8. A display device comprising:
a display panel; and
an edge-type backlight module installed below the display panel, the edge-type backlight module comprising:
- a light guide plate;
- a lampshade installed on a lateral side of the light guide plate;
- a light source installed inside the lampshade for emitting light to the lateral side of the light guide plate; and
- a backlight module housing comprising:
  - a frame forming a holding space for accommodating the light guide plate, the lampshade, the light source, and the display panel, the frame comprising a right wall, a left wall, a top wall, and a bottom wall wherein the right wall, the left wall, the top wall, and the bottom wall form the holding space, the lampshade being disposed close to the top wall or the bottom wall, and a support part being protruding to the holding space from bottoms of the right wall, the left wall, the top wall, and the bottom wall horizontally for supporting the lampshade and the light guide plate and for defining an opening so that the frame is an elastic structure; and
  - at least one lateral alignment structure connected to a side of the frame accommodating the lampshade and protruding to the holding space for laterally immobilizing the display panel.

9. The display device of claim 8 wherein the lateral alignment structure comprises:
- an immobilization part connected to a lateral wall on the side of the frame accommodating the lampshade and protruding to the holding space for laterally immobilizing the display panel; and
- a support part connected to the immobilization part for supporting the display panel.

10. The display device of claim 8 wherein the lateral alignment structure and the frame are connected and formed integrally.

11. The display device of claim 8 wherein at least one rib parallel to the top wall and the bottom wall is disposed on the opening of the frame.

12. A backlight module housing comprising:
- a frame forming a holding space, a light source being accommodated on a side of the holding space; and
- at least one lateral alignment structure connected to the side of the frame accommodating the light source and protruding to the holding space for laterally immobilizing a display panel when the display panel is accommodated inside the holding space of the frame, and the lateral alignment structure comprising:
  - an immobilization part connected to a lateral wall on the side of the frame accommodating the light source and protruding to the holding space for laterally immobilizing the display panel; and
  - a cushion installed between a lampshade of the light source and the display panel and on a side facing the holding space of the immobilization part.

13. A display device comprising:
a display panel; and
an edge-type backlight module installed below the display panel, the edge-type backlight module comprising:
- a light guide plate;
- a lampshade installed on a lateral side of the light guide plate;
- a light source installed inside the lampshade for emitting light to the lateral side of the light guide plate; and
- a backlight module housing comprising:
  - a frame forming a holding space for accommodating the light guide plate, the lampshade, the light source, and the display panel; and
  - at least one lateral alignment structure connected to a side of the frame accommodating the lampshade and protruding to the holding space for laterally immobilizing the display panel, wherein an aperture is formed on the frame and disposed below the lateral alignment structure.

14. A display device comprising:
a display panel; and
an edge-type backlight module installed below the display panel, the edge-type backlight module comprising:
- a light guide plate;
- a lampshade installed on a lateral side of the light guide plate;
- a cushion disposed between the lampshade and the display panel;
- a light source installed inside the lampshade for emitting light to the lateral side of the light guide plate; and
- a backlight module housing comprising:
  - a frame forming a holding space for accommodating the light guide plate, the lampshade, the light source, and the display panel; and
  - at least one lateral alignment structure connected to a side of the frame accommodating the lampshade and protruding to the holding space for laterally immobilizing the display panel.

15. The display device of claim 14 wherein the cushion is made of silica gel material.

* * * * *